(12) United States Patent
Matsuo et al.

(10) Patent No.: US 11,736,343 B2
(45) Date of Patent: Aug. 22, 2023

(54) FAILURE INFLUENCE ESTIMATION APPARATUS, FAILURE INFLUENCE ESTIMATION METHOD AND PROGRAM

(71) Applicant: Nippon Telegraph and Telephone Corporation, Tokyo (JP)

(72) Inventors: Yoichi Matsuo, Musashino (JP); Takehiro Kawata, Musashino (JP); Ken Nishimatsu, Musashino (JP); Tatsuaki Kimura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/621,605

(22) PCT Filed: Jun. 26, 2020

(86) PCT No.: PCT/JP2020/025331
§ 371 (c)(1),
(2) Date: Dec. 21, 2021

(87) PCT Pub. No.: WO2021/002298
PCT Pub. Date: Jan. 7, 2021

(65) Prior Publication Data
US 2022/0417078 A1  Dec. 29, 2022

(30) Foreign Application Priority Data
Jul. 1, 2019  (JP) .................................. 2019-122896

(51) Int. Cl.
*H04L 41/069* (2022.01)
*H04L 41/0686* (2022.01)
(Continued)

(52) U.S. Cl.
CPC ........ *H04L 41/069* (2013.01); *H04L 41/0686* (2013.01); *H04L 41/16* (2013.01); *H04L 43/062* (2013.01)

(58) Field of Classification Search
None
See application file for complete search history.

(56) References Cited

U.S. PATENT DOCUMENTS 8,190,791 B2 *  5/2012  Imai ................... H04N 1/00037
                                                 710/15
2009/0167520 A1 *  7/2009  Watanabe ............. H04L 41/064
                                                  340/507
(Continued)

FOREIGN PATENT DOCUMENTS

JP  2010258894  11/2010
JP  2010258994  11/2010
(Continued)

OTHER PUBLICATIONS

Hanemann et al., "A framework for failure impact analysis and recovery with respect to service level agreements," 2005 IEEE International Conference on Services Computing, Jul. 11, 2005, 8 pages.

(Continued)

*Primary Examiner* — Ranodhi Serrao
(74) *Attorney, Agent, or Firm* — Fish & Richardson P.C.

(57) ABSTRACT

A failure effects estimating device includes an input unit that inputs a log and a traffic amount obtained from a communication system when an abnormality occurs, an estimating unit that estimates a failure effects amount in the communication system, on the basis of the log and the traffic amount, and an output unit that outputs the failure effects amount estimated by the estimating unit.

9 Claims, 5 Drawing Sheets

(51) Int. Cl.
*H04L 41/16* (2022.01)
*H04L 43/062* (2022.01)

(56) References Cited

U.S. PATENT DOCUMENTS

| | | | | |
|---|---|---|---|---|
| 2012/0304007 | A1* | 11/2012 | Hanks | G05B 23/0229 |
| | | | | 714/E11.029 |
| 2013/0226441 | A1* | 8/2013 | Horita | B60Q 9/00 |
| | | | | 701/117 |
| 2017/0214598 | A1 | 7/2017 | Kano | |
| 2018/0212818 | A1 | 7/2018 | Ide et al. | |
| 2018/0351823 | A1* | 12/2018 | Nakatsugawa | G06N 3/02 |
| 2020/0094737 | A1* | 3/2020 | Furukawa | B60W 50/08 |
| 2020/0175754 | A1* | 6/2020 | Abe | G06T 7/74 |
| 2020/0250854 | A1* | 8/2020 | Toyoshi | G06T 7/74 |

FOREIGN PATENT DOCUMENTS

| | | |
|---|---|---|
| JP | 2010268068 | 11/2010 |
| JP | 2014160992 | 9/2014 |
| JP | 2017123048 | 7/2017 |
| JP | 2017135563 | 8/2017 |
| WO | WO 2017064766 | 4/2017 |

OTHER PUBLICATIONS

Ikeda et al., "Inferring causal parameters of anomalies detected by autoencoder using sparse optimization," IEICE Technical Report, 2017, 117(89):1-6, 13 pages (with English Translation).

Matsuo et al., "Root-Cause Diagnosis for Rare Failures Using Bayesian Network with Dynamic Modification," 2018 IEEE International Conference on Communications, May 20, 2018, 6 pages.

Wang et al., "A Dependency Impact Analysis Model for Web Services Evolution," International Conference on Web Services, Jul. 6, 2009, 7 pages.

Yang et al., "Predictive Impact Analysis for Designing a Resilient Cellular Backhaul Network," Sigmetrics 2018, Jun. 18, 2018.

* cited by examiner

US 11,736,343 B2

FAILURE INFLUENCE ESTIMATION APPARATUS, FAILURE INFLUENCE ESTIMATION METHOD AND PROGRAM

CROSS-REFERENCE TO RELATED APPLICATIONS

This application is a National Stage application under 35 U.S.C. § 371 of International Application No. PCT/JP2020/025331, having an International Filing Date of Jun. 26, 2020, which claims priority to Japanese Application Serial No. 2019-122896, filed on Jul. 1, 2019. The disclosure of the prior application is considered part of the disclosure of this application, and is incorporated in its entirety into this application.

TECHNICAL FIELD

The present invention relates to technology for analyzing business contents of an operator in communication system operations, and in particular relates to technology for comprehending effects that abnormalities, such as a failure or the like occurring within the communication system, have on the communication system.

BACKGROUND ART

For a communication service provider, comprehending and swiftly handling abnormal states with regard to abnormalities occurring in the communication system is important. As such, research for detecting abnormalities in communication systems at an early stage (NPL 1) and research for estimating locations of origin and factors (NPL 2) is being carried out.

However, such technology only yields information necessary to handle the abnormality, and information such as the degree of effects occurring within the network when an abnormality is ongoing (whether or not users using services are being affected, etc.), if occurring, to what degree, around how much time is required for recovery (recovery handling time), changes in network state (RTT and throughput values for users), and so forth, cannot be yielded. Effects on users occurring due to equipment abnormalities occurring in the communication system in this way will be referred to as failure effects, and the amount of failure effects will be referred to as failure effects amount.

Nevertheless, such information needs to be reported to users using the services, from the perspective of Service Level Agreement (SLA) and so forth, and is information that the operator needs to comprehend in order to perform reduction of OPEX by leveling operation, and so forth, since the priority of handling can be decided depending on the degree of failure effects (e.g., in a case where there are no failure effects, recovery is performed during the daytime, to reduce the number of nightshift stationed workers, and so forth).

Several studies relating to estimating failure effects in communication systems are being performed. For example, in NPL 3 and NPL 4, dependency relations among target services in a Web service system and sub-services configuring these, and among sub-services and resources (switches, servers, etc.) executing the functions thereof, are defined, and states of services, and the magnitude of effects in a case where there is an abnormal state at certain services, sub-services, or resources, are estimated by externally measuring services, using a simulated user terminal. NPL 5 discloses technology for predicting, when an abnormality occurs at a certain base station in mobile communications, the number of terminals in a range of the base station and estimating the number of terminals that are affected.

CITATION LIST

Non Patent Literature

[NPL 1] Ikeda, Ishibashi, Nakano, Watanabe, Kawahara, "Inferring casual parameters of anomalies detected by autoencoder using sparse optimization," Technical Paper vol. 117, no. 89, IN2017-18, pp. 61-66, June 2017.

[NPL 2] Yoichi Matsuo; Yuusuke Nakano; Akio Watanabe; Keishiro Watanabe; Keisuke Ishibashi, Ryoichi Kawahara, Root-Cause Diagnosis for Rare Failures Using Bayesian Network with Dynamic Modification, ICC 2018, 2018

[NPL 3] A. Hanemann; D. Schmitz; M. Sailer, A framework for failure impact analysis and recovery with respect to service level agreements, SCC05, 2005

[NPL 4] Shuying Wang; Miriam A. M. Capretz, A Dependency Impact Analysis Model for Web Services Evolution, International Conference on Web Services, 2009

[NPL 5] Sen Yang; Yan He; Zihui Ge; Dongmei Wang, Jun Xu Predictive Impact Analysis for Designing a Resilient Cellular Backhaul Network, SIGMETRICS, Vol. 1, No. 30, 2017

SUMMARY OF THE INVENTION

Technical Problem

Occurrence of abnormalities can be detected by conventional abnormality detection and so forth, such as NPL 1, 2, and so forth. However, even when an abnormality occurs, users using services are not necessarily affected. Also, the amount of change in the amount of traffic differs for each type of abnormality, and accordingly, the failure effects cannot be found with conventional techniques. Also, the degree of effects greatly differs for the same abnormality depending on the usage state of the NW (e.g., the usage state greatly differs between daytime and nighttime), and the location of occurrence, but these cannot be taken into consideration.

Conventional failure effects analysis analyzes primarily which equipment or functions will be affected when an abnormality occurs, and how many users will be affected for how long, and so forth, cannot be known. Further, in NPL 3 and NPL 4, there is a need to define the dependency relation between equipment and functions in advance, but construction of these requires expertise of operators with specialized knowledge and great amounts of time, and accordingly failure effects cannot be efficiently estimated.

The present invention has been made with the foregoing in view, and it is an object thereof to provide technology to enable effects on users from an abnormality occurring within a communication system to be efficiently estimated.

Means for Solving the Problem

According to the technology of the disclosure, there is provided a failure effects estimating device, including
an input unit that inputs a log and a traffic amount obtained from a communication system when an abnormality occurs, an estimating unit that estimates a failure effects amount in the communication system, on the basis of the log and the traffic amount, and an output unit that outputs the failure effects amount estimated by the estimating unit.

Effects of the Invention

According to the technology of the disclosure, technology is provided in which effects on users from an abnormality occurring within a communication system can be efficiently estimated.

DESCRIPTION OF EMBODIMENTS

An embodiment of the present invention will be described below with reference to the Figures. The embodiment described below is only an example, and embodiments to which the present invention can be applied are not limited to the following embodiment.

In the present embodiment, the amount of change in traffic amount (may be referred to as traffic change amount) and failure effects time are predicted with regard to an abnormality in equipment (e.g., router or server) that has occurred in a communication system, and the failure effects amount is estimated from the traffic change amount (specifically, the amount of decrease).

In the present embodiment, failure effects amounts include the number of affected users, RTT, throughput, failure effects time (duration of time over which users are affected due to the failure), and so forth. A case of estimating the number of affected users and the failure effects time as failure effects amounts will first be described below.

(Device Configuration Example)

Figure 1:
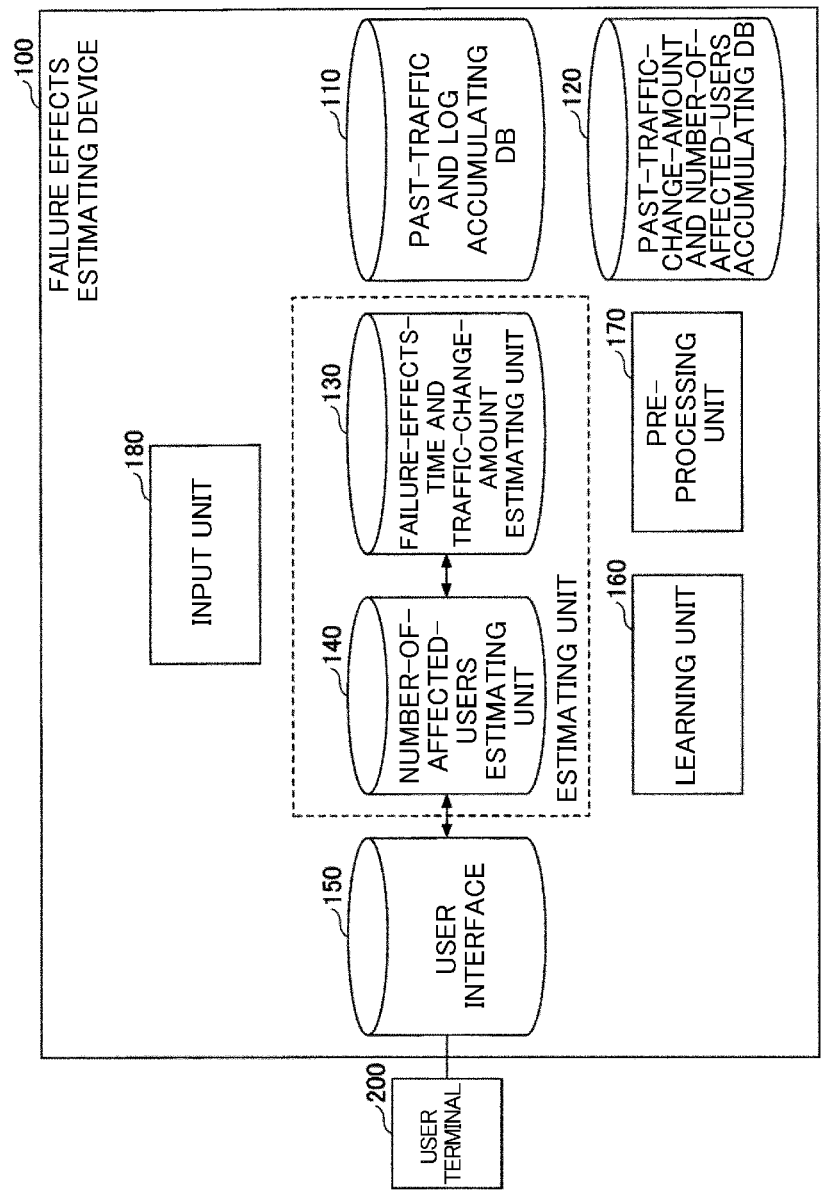
FIG. 1 is a configuration diagram of a failure effects estimating device according to an embodiment of the present invention.

FIG. 1 illustrates a function configuration of a failure effects estimating device 100 that performs estimation of failure effects amount. As illustrated in FIG. 1, the failure effects estimating device 100 is provided with a past-traffic and log accumulating DB (database) 110, a past-traffic-change-amount and number-of-affected-users accumulating DB 120, a failure-effects-time and traffic-change-amount estimating unit 130, a number-of-affected-users estimating unit 140, a user interface 150, a learning unit 160, a pre-processing unit 170, and an input unit 180.

The user interface 150 may be referred to as an output unit. Also, the failure-effects-time and traffic-change-amount estimating unit 130 and the number-of-affected-users estimating unit 140 may be collectively referred to as an estimating unit. Also, the failure-effects-time and traffic-change-amount estimating unit 130 may be referred to as a first estimating unit, and the number-of-affected-users estimating unit 140 may be referred to as a second estimating unit. Also, the failure effects estimating device 100 may be referred to as a failure effects estimating system.

As illustrated in FIG. 1, a user terminal 200 is connected to the failure effects estimating device 100 by a network. The user terminal 200 uses the failure effects estimating device 100 via the user interface 150.

The past-traffic and log accumulating DB 110 accumulates past logs x and past traffic amounts X. The past-traffic-change-amount and number-of-affected-users accumulating DB 120 accumulates past failure effects times, traffic change amounts in past failure effects times, and numbers of affected users in past failure effects times. Actually-observed values are accumulated in the past-traffic and log accumulating DB 110 and the past-traffic-change-amount and number-of-affected-users accumulating DB 120.

The failure-effects-time and traffic-change-amount estimating unit 130 is a model that estimates the failure effects time and the change amount of traffic amount. In the present embodiment, a model using a regression approach is used as this model, and the failure-effects-time and traffic-change-amount estimating unit 130 corresponds to a later-described model 1. Note that all models in the present embodiment learn by machine learning techniques, and any machine learning technique may be used. A regression approach is used in the present embodiment as an example.

The number-of-affected-users estimating unit 140 is a model that estimates the number of affected users from the traffic change amount and logs. In the present embodiment, a model using a regression approach is used as this model, and the number-of-affected-users estimating unit 140 corresponds to a later-described model 2.

The learning unit 160 trains the estimating unit (the failure-effects-time and traffic-change-amount estimating unit 130 and the number-of-affected-users estimating unit 140 in the example in FIG. 1).

The pre-processing unit 170 performs templating of logs. The input unit 180 inputs traffic amount and logs obtained from the communication system when a failure occurs (when an abnormality occurs).

An overview of the operations of the failure effects estimating device 100 illustrated in FIG. 1 will be described next. The learning unit 160 trains the failure-effects-time and traffic-change-amount estimating unit 130 (model 1) by a time-series regression approach such as deepsense or the like, using past logs x and past traffic amounts X accumulated in the past-traffic and log accumulating DB 110. The parameters of the model 1 are optimized through learning.

Next, the number-of-affected-users estimating unit 140 (model 2) is trained using a general regression approach such as support vector regression or the like, on the basis of the past traffic change amount and the past number of affected users, accumulated in the past-traffic-change-amount and number-of-affected-users accumulating DB 120. The parameters of the model 2 are optimized through learning.

After learning, the failure effects estimating device 100 estimates the failure effects time and the number of affected users, on the basis of the traffic amount and logs at the time of failure occurring.

In the configuration illustrated in FIG. 1, the learning unit 160, the past-traffic and log accumulating DB 110, and the past-traffic-change-amount and number-of-affected-users accumulating DB 120 may be provided externally from the failure effects estimating device 100. In this case, the estimating unit that has externally learned (the failure-effects-time and traffic-change-amount estimating unit 130 and the number-of-affected-users estimating unit 140 in the example in FIG. 1) is input to the failure effects estimating device 100, and the failure-effects-time and traffic-change-amount estimating unit 130 and the number-of-affected-users estimating unit 140 are used for estimation.

(Hardware Configuration Example)

The above-described failure effects estimating device 100 in the present embodiment can be realized by causing a computer to execute a program in which are described processing contents described in the present embodiment, for example. Note that this "computer" may be a virtual machine provided by a cloud service. In a case of using a virtual machine, the "hardware" described here is virtual hardware.

The failure effects estimating device 100 according to the present embodiment (including modifications) can be realized by executing a program corresponding to processing carried out by the failure effects estimating device 100, using hardware resources such as a CPU, memory, and so forth, built into the computer. The program can be recorded in a computer-readable recording medium (transportable memory and so forth), and saved or distributed. The program may also be provided over a network, such as via the Internet, email, or the like.

Figure 2:
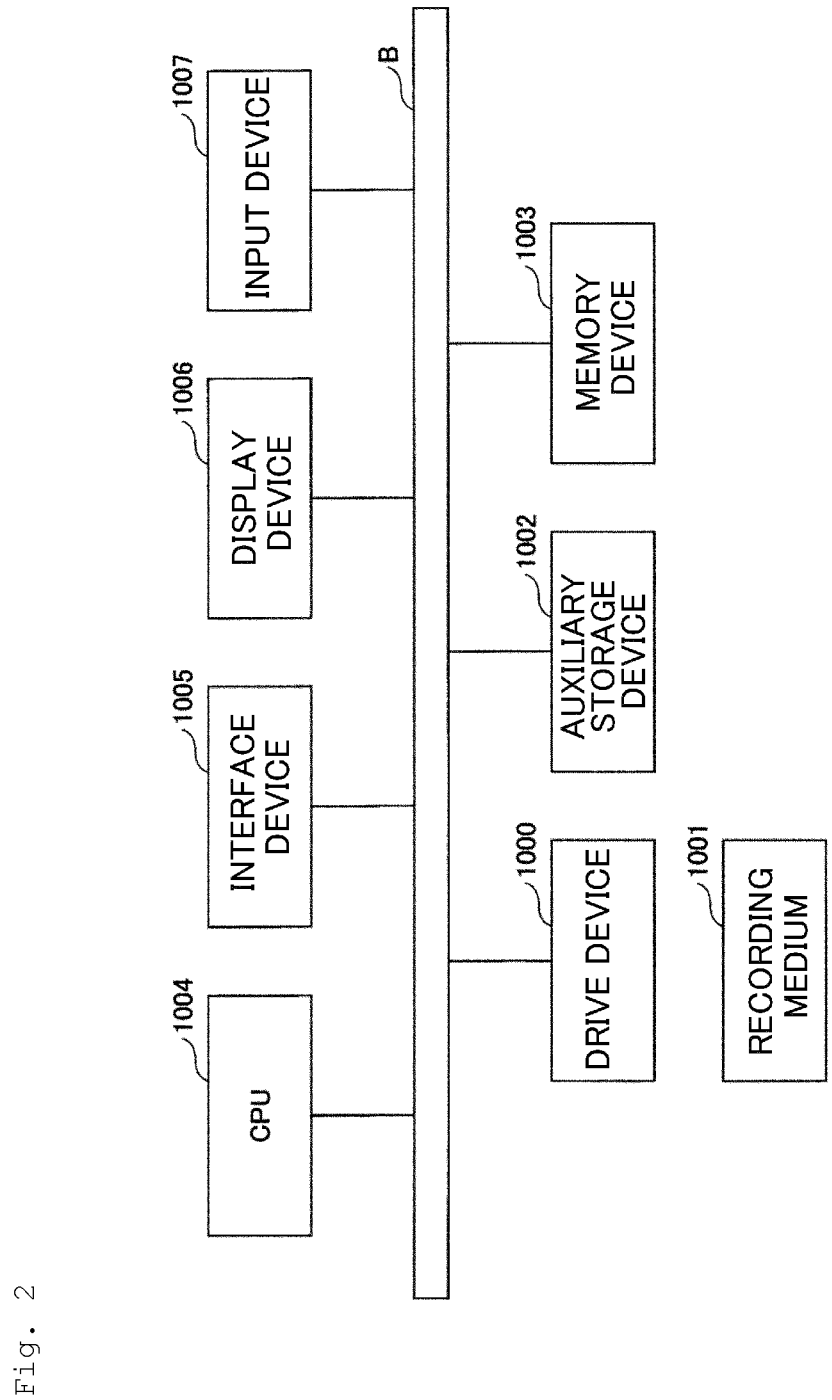
FIG. 2 is a diagram illustrating an example of a hardware configuration of the device.

FIG. 2 is a diagram illustrating a hardware configuration example of the computer in the present embodiment. The computer in FIG. 2 has a drive device 1000, an auxiliary storage device 1002, a memory device 1003, a CPU 1004, an interface device 1005, a display device 1006, and an input device 1007 and so forth, mutually connected to each other by a bus B.

The program that realizes the processing by this computer is provided by a recording medium 1001, such as a CD-ROM, a memory card, or the like, for example. When the recording medium 1001 in which is recorded the program is set in the drive device 1000, the program is installed from the recording medium 1001 to the auxiliary storage device 1002 via the drive device 1000. Note however, that installation of the program does not necessarily have to be performed from the recording medium 1001, and may be downloaded from another computer via a network. The auxiliary storage device 1002 stores necessary files, data, and so forth, as well as storing the installed program.

The memory device 1003 reads the program out from the auxiliary storage device 1002 and stores the program when there is an instruction to start the program. The CPU 1004 realizes functions relating to the failure effects estimating device 100 by following the program stored in the memory device 1003. The interface device 1005 is used as an interface to connect to a network. The display device 1006 displays a GUI (Graphical User Interface) or the like by a program. The input device 1007 is configured of a keyboard and a mouse, buttons, or a touch panel or the like, and is used for inputting various types of operation instructions.

(Example of Detailed Operations)

Next, an example of operations of the failure effects estimating device 100 will be described in detail.

Figure 3:
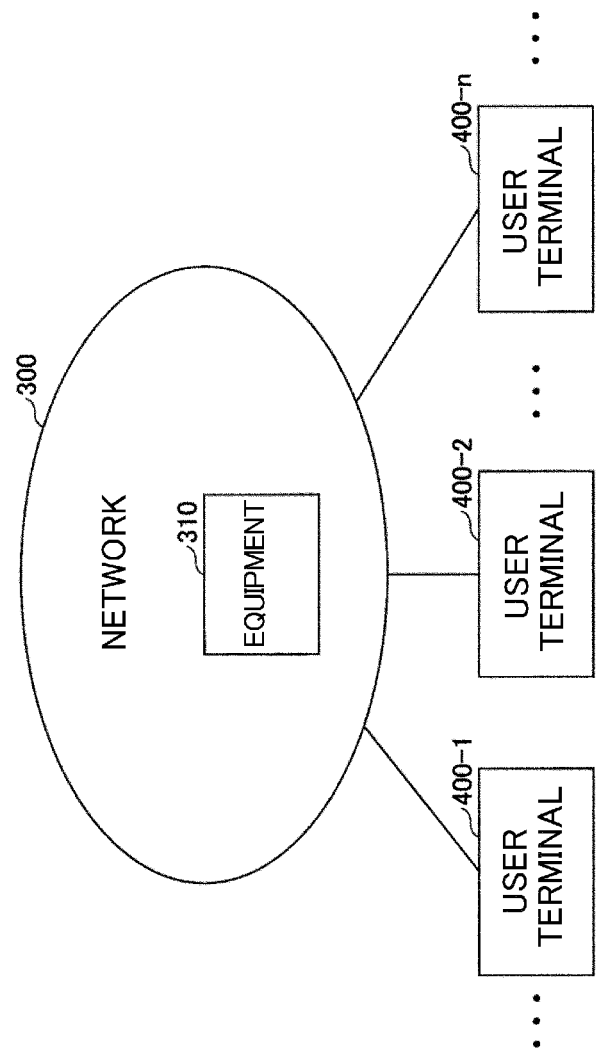
FIG. 3 is a diagram illustrating a network configuration example of an estimation object.

FIG. 3 illustrates an example of a communication system (may be referred to as ICT (Information and Communication Technology) system) on which failure effects occur, which are the object of estimation by the failure effects estimating device 100.

A network 300 in this communication system is provided with a great amount of equipment, such as routers, servers, and so forth. FIG. 3 shows certain equipment (equipment 310) out of the great amount of equipment. Also, a great number of user terminals 400-1 through 400-$n$ using services (examples: Web services, video services, audio services, etc.) are connected to the network 300.

The equipment 310 is a server that provides services to the user terminals 400-1 through 400-$n$, for example. The equipment 310 may also be a router that transfers traffic from a server providing services to the user terminals 400-1 through 400-$n$, to the user terminals 400-1 through 400-$n$. The equipment 310 may also be any equipment other than these. Also, "user terminal" may be referred to as "user".

Past logs accumulated in the past-traffic and log accumulating DB 110 are, for example, past syslog, show tech logs, or the like, obtained from certain equipment. The certain equipment is, for example, the above-described equipment 310.

The past traffic amount accumulated in the past-traffic and log accumulating DB 110 is the traffic amount of this equipment. The traffic amount of this equipment may be the amount of traffic transmitted from this equipment to the user-terminal side, may be the amount of traffic that this equipment receives from the user-terminal side, may be the total of the amount of traffic transmitted from this equipment to the user-terminal side and the amount of traffic that this equipment receives from the user-terminal side, or may be the amount of all traffic that this equipment transmits and receives, regardless of the direction of traffic. Also, the amount of traffic may be the number of PPPoE sessions generated by this equipment or the like.

Contained in the syslog and the show tech logs are information of redundant configuration within the equipment, telemetry information of light level and so forth, information regarding the state of the equipment, information regarding failures that have occurred, and so forth. Also, data accumulated in the past-traffic and log accumulating DB 110 includes data when normal and data when an abnormality occurs.

The past-traffic and log accumulating DB 110 accumulates data collected from a great amount of equipment.

The past-traffic-change-amount and number-of-affected-users accumulating DB 120 accumulates failure effects time, traffic change amount during the failure effects time, and the number of affected users during this failure effects time. Data accumulated in the past-traffic-change-amount and number-of-affected-users accumulating DB 120 is data collected at clock times corresponding to the collection clock times of data accumulated in the past-traffic and log accumulating DB 110, for example.

The failure effects time is, for example, the time over which affected user terminals (e.g., user terminals of which throughput deteriorated when receiving services) existed, due to an abnormality occurring in the communication system.

The number of affected users may be, for example, the number of user terminals at which deterioration of quality of services noticeable by the users occurred at the user terminals due to an abnormality occurring in the communication system, may be the number of user terminals at which throughput relating to services deteriorated by a predetermined threshold value or more at the user terminals, or may be another number.

The traffic amount of the equipment and the amount of change thereof reflects whether or not there is communication, and service usage states, and accordingly using the information (logs) of equipment states and the traffic amounts at that time enable failure effects to be estimated, taking into consideration the type of abnormality and the NW usage states.

Also, by using data when normal and data when an abnormality occurs, the time at which the abnormality is resolved and the amount of change of traffic due to the abnormality can be predicted. Impact on service is estimated by estimating the number of affected users. Also, performing learning using past data when normal and when abnormal enables estimation to be made without relying on specialized knowledge.

Figure 4:
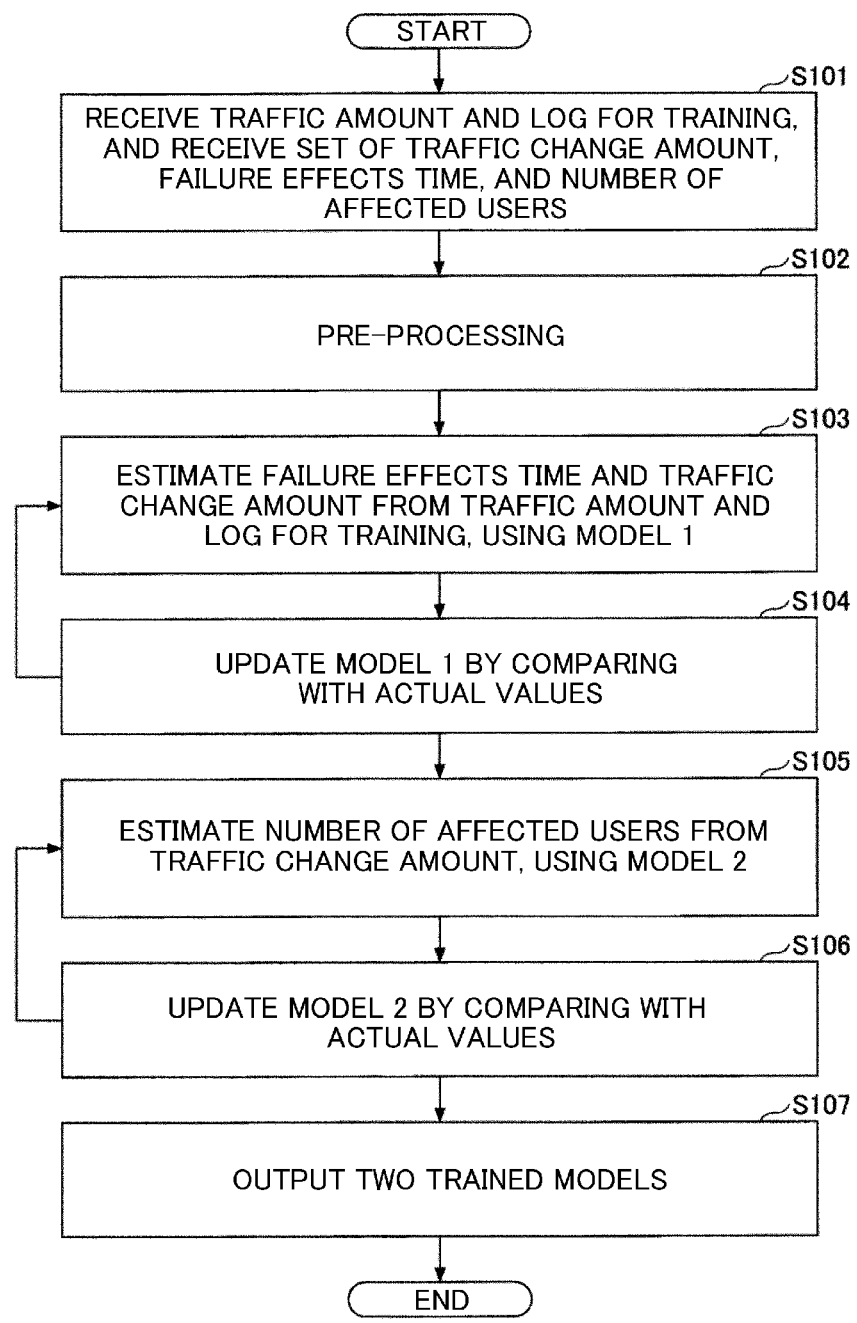
FIG. 4 is a flowchart illustrating processing when learning.

Next, operations when learning will be described with reference to the flowchart in FIG. 4.

<S101: Acquiring Training Data>

The learning unit 160 acquires traffic amount and logs (show tech logs, syslog, etc.) from the past-traffic and log accumulating DB 110. The learning unit 160 further acquires a set of traffic change amount, failure effects time, and number of affected users, from the past-traffic-change-amount and number-of-affected-users accumulating DB 120.

<S102: Pre-Processing>

The pre-processing unit 170 performs templating of the logs, so that logs (show tech logs, syslog, etc.) that are text information can be handled as numerical values. Templating itself is a known art. Templating is a technology in which each line of a log is automatically allocated a natural number, and the same number is allocated to logs of which portions other than numerical value portions such as clock time information, IP addresses, and so forth are the same. That is to say, the pre-processing unit 170 allocates numbers to each line of logs. Accordingly, logs can be handled as numerical values thereafter.

<S103: Estimation of Failure Effects Time and Change Amount of Traffic Amount>

The learning unit 160 inputs the traffic amount and logs for learning into the failure-effects-time and traffic-change-amount estimating unit 130 (model 1), and acquires the estimated values of failure effects time and change amount of traffic amount (loss amount) output from the failure-effects-time and traffic-change-amount estimating unit 130.

A detailed example of the failure-effects-time and traffic-change-amount estimating unit 130 (model 1) will be described below.

In certain equipment (e.g., the equipment 310 in FIG. 3), an M-dimensional vector representing the state of logs generated at the equipment at clock time t is written as $x_t$. Note that here, M (an integer equal to or greater than 0) is the number of types of templates, $x_{t,m}$ is m elements of clock time t, and is the number of appearances of a log of the m'th template, or the value of the log of the m'th template. The "number of appearances" in a case where $x_{t,m}$ is the number of appearances of the log of the m'th template at clock time t is the number of appearances from clock time t−1 to t. Also, $X_t$ is a scalar value that represents the traffic amount at the clock time t of this equipment.

With the failure effects time as u, $V_{t \to t+u}$, is the amount of loss of traffic due to the failure effects from clock time t to t+u. The amount of loss of traffic is, for example, the amount in reduction in the number of sessions established at this equipment (equipment that is the object of acquisition of logs), or the amount of reduction in transmitted (received) packets. In a case of the amount of reduction in the number of sessions, for example, if the number of sessions at clock time t is 100 and the number of sessions at clock time t+u is 10, the amount of reduction is 90.

The traffic amount $X_t$ is dependent on past traffic amounts $x_{t-1}, x_{t-2}, \ldots, x_{t-k}$. It can be thought that information relating to the state of the equipment is included in $x_{t-1}, x_{t-2}, \ldots, x_{t-k}$, and accordingly u, $V_{t \to t+u}$ is estimated by inputting this data to the expression below. Note that k which represents the duration of time from t in the past may be decided in advance, or an appropriate k may be found by learning.

The model represented by the following expression corresponds to the failure-effects-time and traffic-change-amount estimating unit 130 (model 1).

$$u, V_{t \to t+u} = L(X_{t-1}, X_{t-2}, \ldots, X_{t-k}, x_{t-1}, x_{t-2}, \ldots, x_{t-k})$$

L in the above is an estimator, and is a model obtained by, for example, a regression approach to time-series data, such as deepsense[ ] or the like.

<S104: Updating>

The learning unit 160 updates the model 1 by comparing the failure effects time and traffic change amount (loss amount) output from the failure-effects-time and traffic-change-amount estimating unit 130 with actual values.

Preparing a sufficient number of learning datasets u, $V_{t \to t+u}, X_{t-1}, X_{t-2}, \ldots, X_{t-k}, x_{t-1}, x_{t-2}, \ldots, x_{t-k}$, and repeating the above updating, enables the model 1 in which optimized parameters are applied to be obtained.

<S105: Estimating Number of Affected Users>

The learning unit 160 inputs traffic changes amounts for learning and logs for learning to the number-of-affected-users estimating unit 140 (model 2), and acquires estimation values of the number of affected users output from the number-of-affected-users estimating unit 140. A detailed example of the number-of-affected-users estimating unit 140 (model 2) will be described below.

The number of affected users during clock time t→t+u (the number of affected users during the period from clock time t to clock time t+u) is written as $U_{t \to t+u}$. $U_{t \to t+u}$ is estimated by inputting $V_{t \to t+u}, x_{t-1}, x_{t-2}, \ldots, x_{t-k}$ into the following Expression. The model represented by the following expression corresponds to the number-of-affected-users estimating unit 140 (model 2).

$$U_{t \to t+u} = H(V_{t \to t+u}, x_{t-1}, x_{t-2}, \ldots, x_{t-k})$$

H here is an estimator, and a general regression model, used in an environment where datasets of traffic change amount and the number of affected users can be acquired, can be used. Note that the traffic change amount is the change amount in the number of sessions such as PPPoE, for example.

<S106: Updating>

The learning unit 160 updates the model 2 by comparing the number of affected users output from the number-of-affected-users estimating unit 140 with actual values.

Preparing a sufficient number of learning datasets $U_{t \to t+u}$, $V_{t \to t+u}, x_{t-1}, x_{t-2}, \ldots, x_{t-k}$, and repeating the above updating, enables the regression model 2 in which optimized parameters are applied to be obtained.

<S107: Outputting>

The learning unit 160 outputs the two models (model 1 and model 2) trained by the regression approach. Note that in the present embodiment, the models themselves (specifically, programs corresponding to expressions representing the models) are provided to the failure effects estimating device 100, and accordingly the trained models that the learning unit 160 outputs are optimized parameters set to the models.

Figure 5:
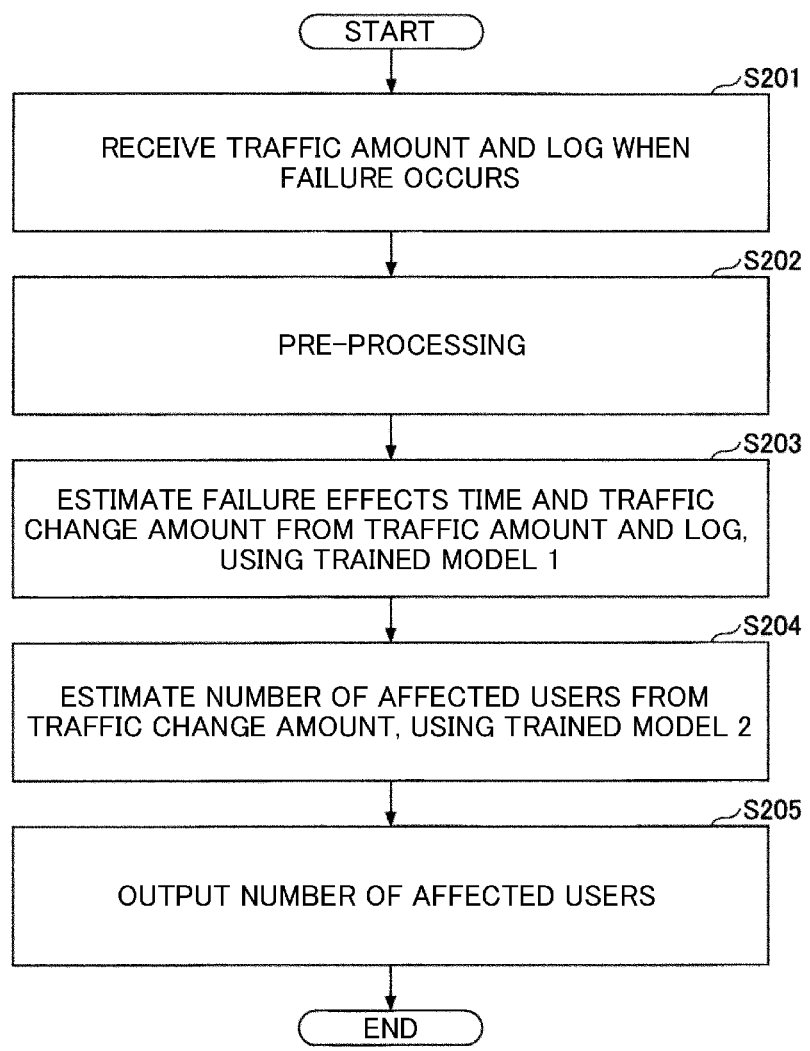
FIG. 5 is a flowchart illustrating processing when estimating.

Next, operations when estimating will be described with reference to the flowchart in FIG. 5. The failure-effects-time and traffic-change-amount estimating unit 130 and the number-of-affected-users estimating unit 140 illustrated in FIG. 1 are already trained here.

<S201: Acquiring Traffic Amounts and Logs>

The input unit 180 receives and inputs traffic amounts and logs when a failure occurs in the communication system (when an abnormality occurs), from the communication system. These traffic amounts and these logs are acquired from certain equipment in the communication system regarding which a failure has occurred. This equipment may be set in advance, may be any equipment, or may be equipment at which the failure has occurred.

The traffic amounts and logs to be input correspond to the above-described $X_{t-1}, X_{t-2}, \ldots, X_{t-k}, x_{t-1}, x_{t-2}, \ldots, x_{t-k}$.

<S202: Pre-Processing>

The pre-processing unit 170 performs templating of logs acquired in S201, in the same way as when learning.

<S203: Estimation of Failure Effects Time and Traffic Change Amount>

The input unit 180 inputs the traffic amounts and the pre-processed logs into the failure-effects-time and traffic-change-amount estimating unit 130 (model 1). The failure-effects-time and traffic-change-amount estimating unit 130 (model 1) outputs the failure effects time and the traffic change amount. The failure effects time and the traffic change amount correspond to the above-described $u, V_{t \to t+u}$.

<S204: Estimating Number of Affected Users>

The traffic change amounts and logs are input to the number-of-affected-users estimating unit 140 (model 2), the number-of-affected-users estimating unit 140 estimates the number of affected users, and outputs to the user interface 150. The traffic change amounts and logs correspond to the above-described $V_{t \to t+u}, x_{t-1}, x_{t-2}, \ldots, x_{t-k}$, and the number of affected users corresponds to the above-described $U_{t \to t+u}$.

<S205: Output>

The user interface 150 outputs the number of affected users to the user terminal 200. The user interface 150 may also output the number of affected users and the traffic change amount to the user terminal 200. The user interface 150 may also further output the failure effects time to the user terminal 200.

(Modification)

Although in the above example, separate models such as L and H are created, and learning and estimation is performed, the number of affected users and the failure effects time may be estimated from the traffic amounts and logs with a single model, without predicting the change amount of the traffic amount. Specifically, estimation is performed by the following expression.

$$u, U_{t \to t+u} = L'(X_{t-1}, X_{t-2}, \ldots, X_{t-k}, x_{t-1}, x_{t-2}, \ldots, x_{t-k})$$

Accordingly, the number of affected users and the failure effects time can be estimated without estimating the change amount of the traffic amount. Learning can be carried out using datasets for training to update the parameters, in the same way as with the example above. Also, estimation is the same as the example above.

In a case of executing learning and estimation using one model in this way, the estimating unit of the configuration illustrated in FIG. 1 (the failure-effects-time and traffic-change-amount estimating unit 130 and the number-of-affected-users estimating unit 140) is replaced with the above model. Also, the past-traffic-change-amount and number-of-affected-users accumulating DB 120 is replaced with a number-of-affected-users accumulating DB 125 that accumulates the number of affected users.

Conversely, when the operator desires to prevent black-boxing and check to what degree the traffic amount changes, this can be realized by created models in two stages, as already described above.

(Estimation of RTT and Throughput)

By replacing the "number of affected users" described so far with a different amount, this different amount can be estimated. This different amount may be RTT (Round Trip Time, round-trip delay time) observed at user terminals receiving services, for example, or may be throughput. RTT and throughput will be collectively referred to as "network index value".

Expressing the network index value in failure effects time as $C_{t \to t+u}$, $C_{t \to t+u}$ can be estimated by the following two expressions (models).

$$u, V_{t \to t+u} = L(X_{t-1}, X_{t-2}, \ldots, X_{t-k}, x_{t-1}, x_{t-2}, \ldots, x_{t-k})$$

$$C_{t \to t+u} = H'(V_{t \to t+u}, x_{t-1}, x_{t-2}, \ldots, x_{t-k})$$

Also, in a case of using one model as in the modification, $C_{t \to t+u}$ can be estimated by the following one expression (model).

$$u, C_{t \to t+u} = L''(X_{t-1}, X_{t-2}, \ldots, X_{t-k}, x_{t-1}, x_{t-2}, \ldots, X_{t-k})$$

(Advantages of Embodiment)

According to the technology of the present embodiment, communication service providers can analyze failure effects, and thus enabling prompt reporting to users using services to be performed from the perspective of SLA and so forth, and handling priorities can be decided in accordance with the degree of failure effects (e.g., in a case where there are no failure effects, recovery is performed during the daytime, to reduce the number of nightshift stationed workers, and so forth). Accordingly, this is information necessary in order to perform reduction of OPEX by leveling operation, and so forth.

(Summarization)

In the present embodiment, at least the following failure effects estimating device, failure effects estimating method, and program are provided.

(Item 1)

A failure effects estimating device, including
an input unit that inputs a log and a traffic amount obtained from a communication system when an abnormality occurs,
an estimating unit that estimates a failure effects amount in the communication system, on the basis of the log and the traffic amount, and
an output unit that outputs the failure effects amount estimated by the estimating unit.

(Item 2)

The failure effects estimating device according to item 1, wherein the estimating unit includes
a first estimating unit that estimates a failure effects time and a traffic change amount, on the basis of the log and the traffic amount, and
a second estimating unit that estimates the number of affected users as the failure effects amount, on the basis of the log and the traffic change amount.

(Item 3)

The failure effects estimating device according to item 1, wherein the estimating unit includes
a first estimating unit that estimates a failure effects time and a traffic change amount, on the basis of the log and the traffic amount, and
a second estimating unit that estimates a network index value as the failure effects amount, on the basis of the log and the traffic change amount.

(Item 4)

The failure effects estimating device according to any one of items 1 to 3, wherein the estimating unit is a model trained by machine learning, on the basis of a past log, a past traffic amount, and a past failure effects amount.

(Item 5)

A failure effects estimating method executed by a failure effects estimating device, the method including an input step of inputting a log and a traffic amount obtained from a communication system when an abnormality occurs, an estimating step of estimating a failure effects amount in the communication system, on the basis of the log and the traffic amount, and an output step of outputting the failure effects amount estimated in the estimating step.

(Item 6)

A program causing a computer to function as parts of the failure effects estimating device according to any one of items 1 to 4.

Although the present embodiment has been described above, the present invention is not limited to this particular embodiment, and various modifications and alterations may be made within the scope of the essence of the present invention set forth in the Claims.

REFERENCE SIGNS LIST

100 Failure effects estimating device
110 Past-traffic and log accumulating DB
120 Past-traffic-change-amount and number-of-affected-users accumulating DB
130 Failure-effects-time and traffic-change-amount estimating unit
140 Number-of-affected-users estimating unit
150 User interface
160 Learning unit
170 Pre-processing unit
180 Input unit
300 Network
310 Equipment
400-1 through 400-n User terminal
1000 Drive device
1001 Recording medium
1002 Auxiliary storage device
1003 Memory device
1004 CPU
1005 Interface device
1006 Display device
1007 Input device

The invention claimed is:

1. A failure effects estimating device, comprising:
an input unit configured to input a log and a traffic amount obtained from a communication system when an abnormality occurs;
an estimating unit, including one or more processors, configured to estimate a failure effects amount in the communication system, on the basis of the log and the traffic amount, wherein estimating the failure effects amount comprises:
(i) estimating, based on the log and the traffic amount, a failure effects time that represents a time length during which one or more user terminals are affected by abnormality occurring in the communication system,
(ii) estimating a traffic change amount that represents an amount of decrease in network traffic during the estimated failure effects time, and
(iii) estimating the failure effects amount, comprising: estimating a network index value as the failure effects amount based on the log and the estimated traffic change amount, wherein the network index value represents a round trip delay time (RTT) observed at user terminals receiving services; and
an output unit configured to output the failure effects amount estimated by the estimating unit.

2. The failure effects estimating device according to claim 1, wherein
the estimating unit is configured to estimate the number of affected users as the failure effects amount, on the basis of the log and the traffic change amount, wherein the number of affected user represents the number of user terminals at which network throughput relating to services deteriorated by at least a predetermined threshold value at the user terminals.

3. The failure effects estimating device according to claim 1, wherein
the estimating unit is a model trained by machine learning, on the basis of a past log, a past traffic amount, and a past failure effects amount.

4. A failure effects estimating method executed by a failure effects estimating device, the method comprising:
an input step of inputting a log and a traffic amount obtained from a communication system when an abnormality occurs;
an estimating step of estimating a failure effects amount in the communication system, on the basis of the log and the traffic amount, wherein estimating the failure effects amount comprises:
(i) estimating, based on the log and the traffic amount, a failure effects time that represents a time length during which one or more user terminals are affected by abnormality occurring in the communication system,
(ii) estimating a traffic change amount that represents an amount of decrease in network traffic during the estimated failure effects time, and
(iii) estimating the failure effects amount, comprising: estimating a network index value as the failure effects amount based on the log and the estimated traffic change amount wherein the network index value represents a round trip delay time (RTT) observed at user terminals receiving services; and
an output step of outputting the failure effects amount estimated in the estimating step.

5. The failure effects estimating method according to claim 4, wherein the estimating step comprises:
estimating the number of affected users as the failure effects amount, on the basis of the log and the traffic change amount, wherein the number of affected user represents the number of user terminals at which network throughput relating to services deteriorated by at least a predetermined threshold value at the user terminals.

6. The failure effects estimating method according to claim 4, wherein the estimating step comprises:
estimating the failure effects amount in the communication system using a model trained by machine learning, on the basis of a past log, a past traffic amount, and a past failure effects amount.

7. A non-transitory computer readable medium storing a program causing a computer to function as parts of a failure effects estimating device to perform:
an input step of inputting a log and a traffic amount obtained from a communication system when an abnormality occurs;

an estimating step of estimating a failure effects amount in the communication system, on the basis of the log and the traffic amount, wherein estimating the failure effects amount comprises:

(i) estimating, based on the log and the traffic amount, a failure effects time that represents a time length during which one or more user terminals are affected by abnormality occurring in the communication system, (ii) estimating a traffic change amount that represents an amount of decrease in network traffic during the estimated failure effects time, and (iii) estimating the failure effects amount, comprising: estimating a network index value as the failure effects amount based on the log and the estimated traffic change amount, wherein the network index value represents a round trip delay time (RTT) observed at user terminals receiving services; and an output step of outputting the failure effects amount estimated in the estimating step.

8. The non-transitory computer readable medium according to claim 7, wherein the estimating step comprises:

estimating the number of affected users as the failure effects amount, on the basis of the log and the traffic change amount, wherein the number of affected user represents the number of user terminals at which network throughput relating to services deteriorated by at least a predetermined threshold value at the user terminals.

9. The non-transitory computer readable medium according to claim 7, wherein the estimating step comprises:

estimating the failure effects amount in the communication system using a model trained by machine learning, on the basis of a past log, a past traffic amount, and a past failure effects amount.

* * * * *